United States Patent [19]

Cheng

[11] Patent Number: 5,161,811
[45] Date of Patent: Nov. 10, 1992

[54] TROLLEY WITH A FOLDABLE SEAT ASSEMBLY

[76] Inventor: Chiun-Jer Cheng, 1 Fl., No. 20, Lane 327, Sec. 2, Chung Shan Rd., Chung Ho City, Taipei Hsien, Taiwan

[21] Appl. No.: 755,097

[22] Filed: Sep. 5, 1991

[51] Int. Cl.$^5$ .............................................. B62B 1/12
[52] U.S. Cl. ...................................... 280/30; 280/655; 280/47.18; 297/118
[58] Field of Search ..................... 280/47.18, 47.25, 30, 280/655, 654, 645; 297/118

[56] References Cited

U.S. PATENT DOCUMENTS 2,809,047 10/1957 Strohmaier ........................... 280/654
3,997,213 12/1976 Smith et al. ....................... 280/47.18
4,630,837 12/1986 Kazmark ............................. 280/655

FOREIGN PATENT DOCUMENTS 3720516 12/1988 Fed. Rep. of Germany ...... 280/655

Primary Examiner—David M. Mitchell
Attorney, Agent, or Firm—Staas & Halsey

[57] ABSTRACT

A trolley includes a main frame, a wheel device, a support frame attached to a front side of the main frame, and a foldable seat assembly attached to a rear side of the main frame. When the seat assembly is in an extended status, a second pair of stands secured to a first pair of stands contact the ground with the wheel device to provide a support for a seat device. When the seat assembly is in a folded status, the first and second pairs of stands fold close to the main frame.

3 Claims, 5 Drawing Sheets

TROLLEY WITH A FOLDABLE SEAT ASSEMBLY

BACKGROUND OF THE INVENTION

1. Field of the Invention

This invention relates to a trolley for carrying luggage or the like, and in particular relates to a trolley with a foldable seat assembly on the rear side thereof.

2. Description of the Related Art

Trolleys are popular tools for carrying luggage or the like. However, in conventional trolleys with no attached seat, it is often inconvenient in crowded transportation terminals for the user to leave the trolley unattended to take a seat some distance away therefrom when he is tired. Since there are too many elements comprising a seat, no manufacturer has successfully combined a trolley and a seat without increasing the combined size thereof, yielding a storage burden.

It is the purpose of present invention, therefore, to mitigate and/or obviate the above-mentioned drawback in the manner set forth in detail description of the preferred embodiment.

SUMMARY OF THE INVENTION

The invention provides a trolley with a main frame, a wheel means, a support frame attached to a front side of the main frame, and a foldable seat assembly on a rear side thereof. The foldable seat assembly comprises a sleeve means slidably mounted on two outer vertical bars of the main frame, a seat means pivoted on the sleeve means, and two pairs of stands pivotally connected at their middle portions thereof. When the seat assembly is in an extended status, the lower ends of the first pair of stands are positioned on the ground, together with the wheels, to provide stable support. The upper ends of the second pair of stands contact the underside of a seat plate and thus support the seat plate. When the seat assembly is in a folded status, the first and second pairs of stands are folded closed to the main frame.

A primary object of the present invention is to provide a trolley having a foldable seat assembly attached to a rear side thereof which can be folded close to the trolley without increasing the overall size of whole structure.

Further objects and advantages of the present invention will become apparent as the following description proceeds, and the features of novelty which characterize the invention are pointed out with particularity in claims annexed to and forming a part of this invention.

DETAILED DESCRIPTION OF THE PREFERRED EMBODIMENTS

Figure 1:
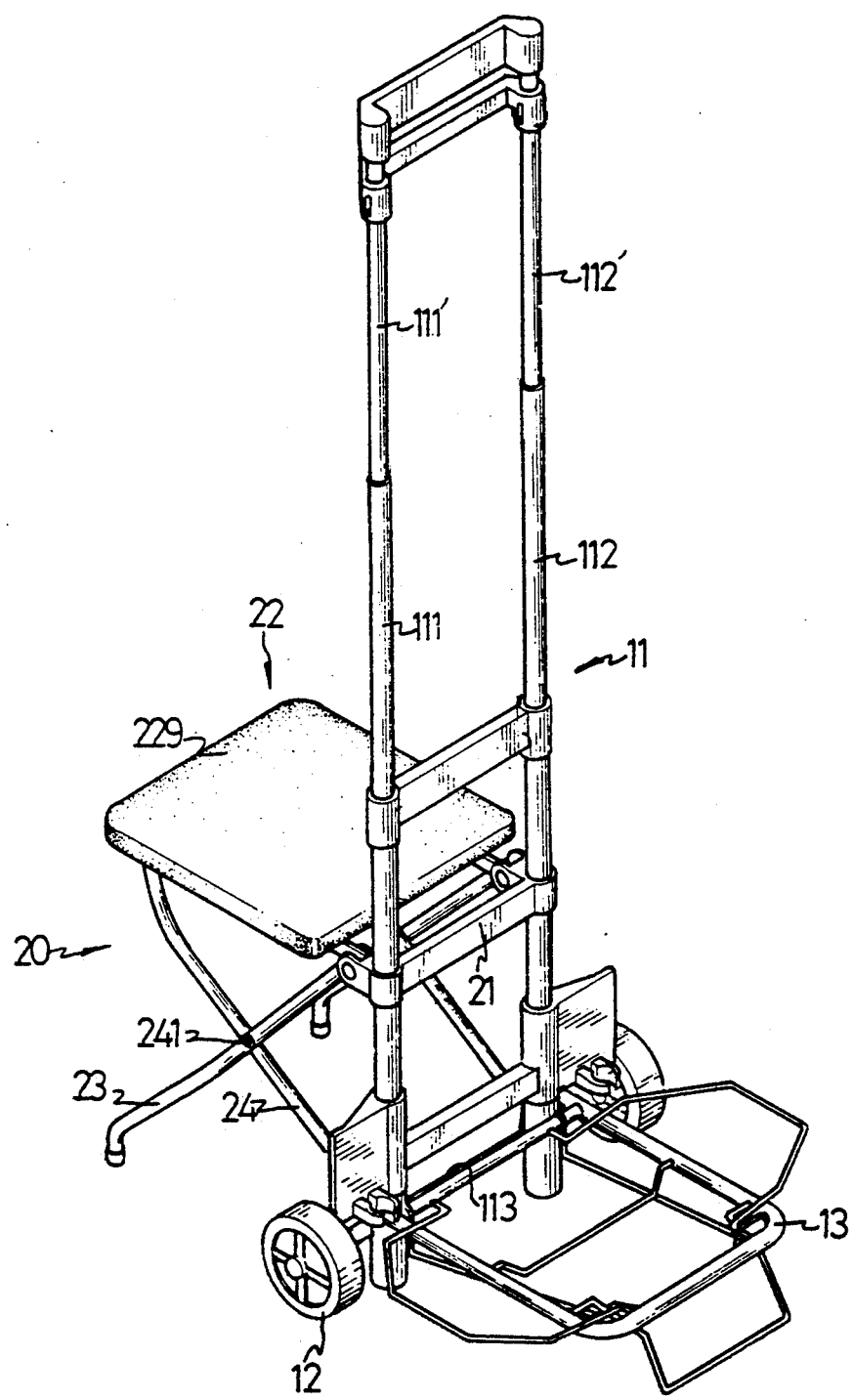
FIG. 1 is a perspective view of a trolley with a foldable seat assembly in accordance with the present invention.

Referring to FIG. 1, a trolley generally comprises a main frame 11, a wheel means 12, and a support frame 13. The main frame 11 has first and second outer vertical bars 111 and 112 and first and second inner vertical bars 111' and 112': the latter respectively and slidably received in the former. The wheel means 12 is attached to the main frame 11, and the support frame 13 is securely attached to a bottom of the main frame 11 for carry articles. Such a structure is conventional and will not be further described.

The present invention is characterized in that a foldable seat assembly 20 is attached to a rear side of the trolley. The foldable seat assembly 20 comprises a sleeve means 21 slidably mounted on the first and second outer vertical bars 111 and 112, a seat means 22 pivoted to the sleeve means 21, a first pair of stands 23, and a second pair of stands 24.

Figure 2:
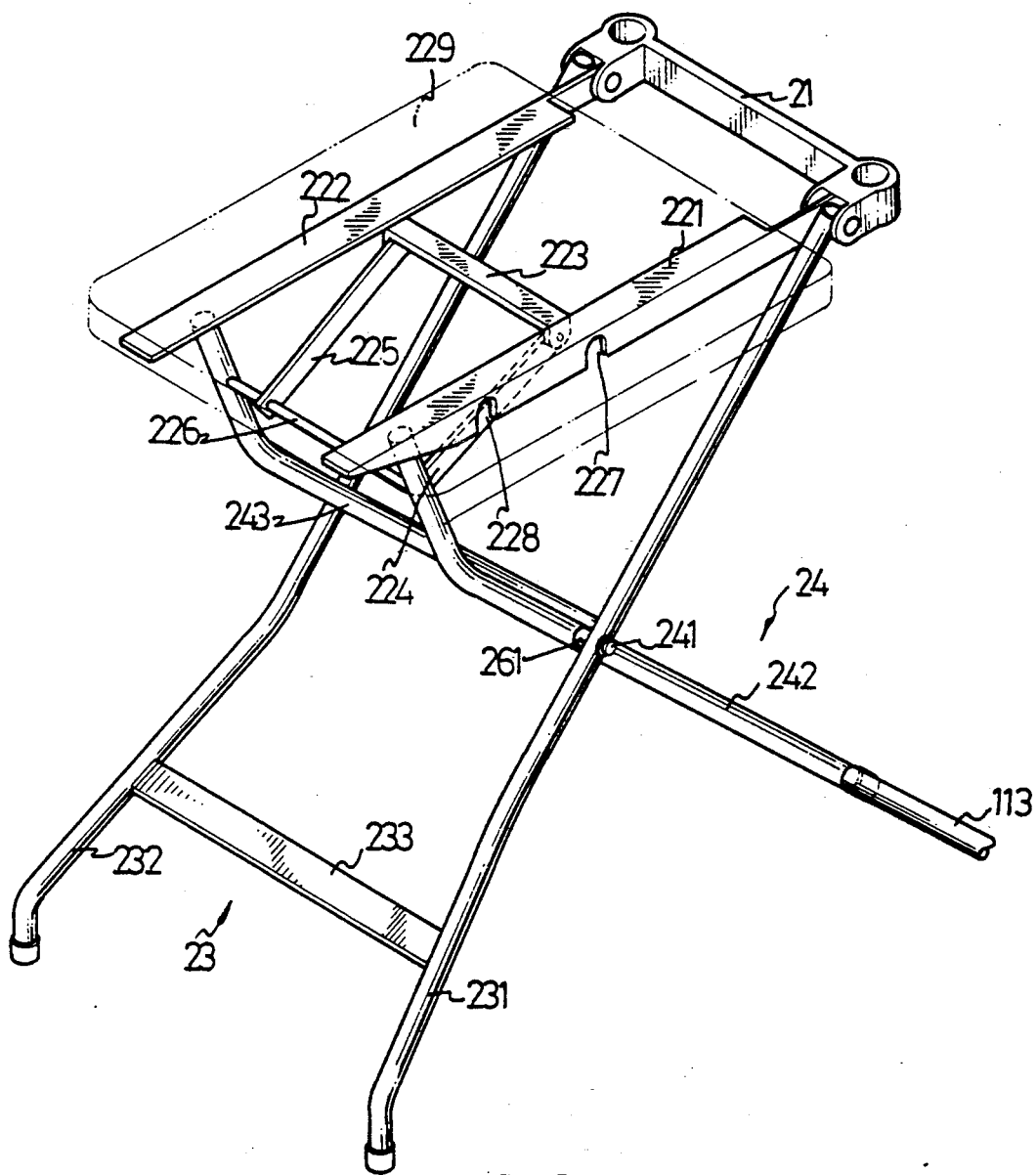
FIG. 2 is a perspective view of the foldable seat assembly of the trolley in accordance with the invention.

Referring to FIG. 2, the seat means 22 includes a first seat-supporting member 221 pivoted to the sleeve means 21 at a first end thereof, a second seat-supporting member 222 also pivoted to the sleeve means 21 at a first end thereof, a connecting member 223 which has a first end fixed to a middle portion of the first seat-supporting member 221 and a second end fixed to a middle portion of the second seat-supporting member 222, a first swaying member 224 having a first end pivoted to the first end of the first connecting member 223 and a second end with a first hole (not labeled), a second swaying member 225 having a first end pivoted to the second end of the connecting member 223 and a second end with a hole (not labeled), a linking rod 226 passing through the first and second holes, and a seat plate 229 fixed on top sides of the first and second seat-supporting members 221 and 222. The first and second swaying members 224 and 225 are pivotable about the linking rod 226, which will be discussed later.

Still referring to FIGS. 1 and 2, the first pair of stands 23 has a first stand 231 with an upper end pivoted to the sleeve means 21, a second stand 232 with an upper end pivoted to the sleeve means 21, and a first cross member 233 connecting the first and second stands 231 and 232. The second pair of stands 24 consists of a third stand 242, a fourth stand 243, and a second cross member 113 securely attached to the outer vertical bars 111 and 112 for connecting the third and fourth stands 242 and 243. The third and fourth stands 242 and 243 are pivoted about the second cross member 113. In addition, a middle portion of first stand 231 pivoted with a middle portion of the third stand 242 by means of a bolt 241 or other suitable means. A middle portion of the second stand 232 is pivoted with middle portion of the fourth stand 243 by means of a second bolt (not labeled) or other suitable means. A first retaining ring 261 is provided between the pivot point (not labeled) of the first and third stands 232 and 242 around the bolt 241. A second retaining ring (not labeled) is provided between the pivot points (not labeled) of the second and fourth stands 232 and 243. Optionally, the connecting members 223 can be attached to the swaying members 224 and 225 by means of screws. A cutout 227 is formed in each seat-supporting members 221 and 222 so as to facilitate the engagement of connecting member 223 to the swaying members 224 and 225.

Figure 3:
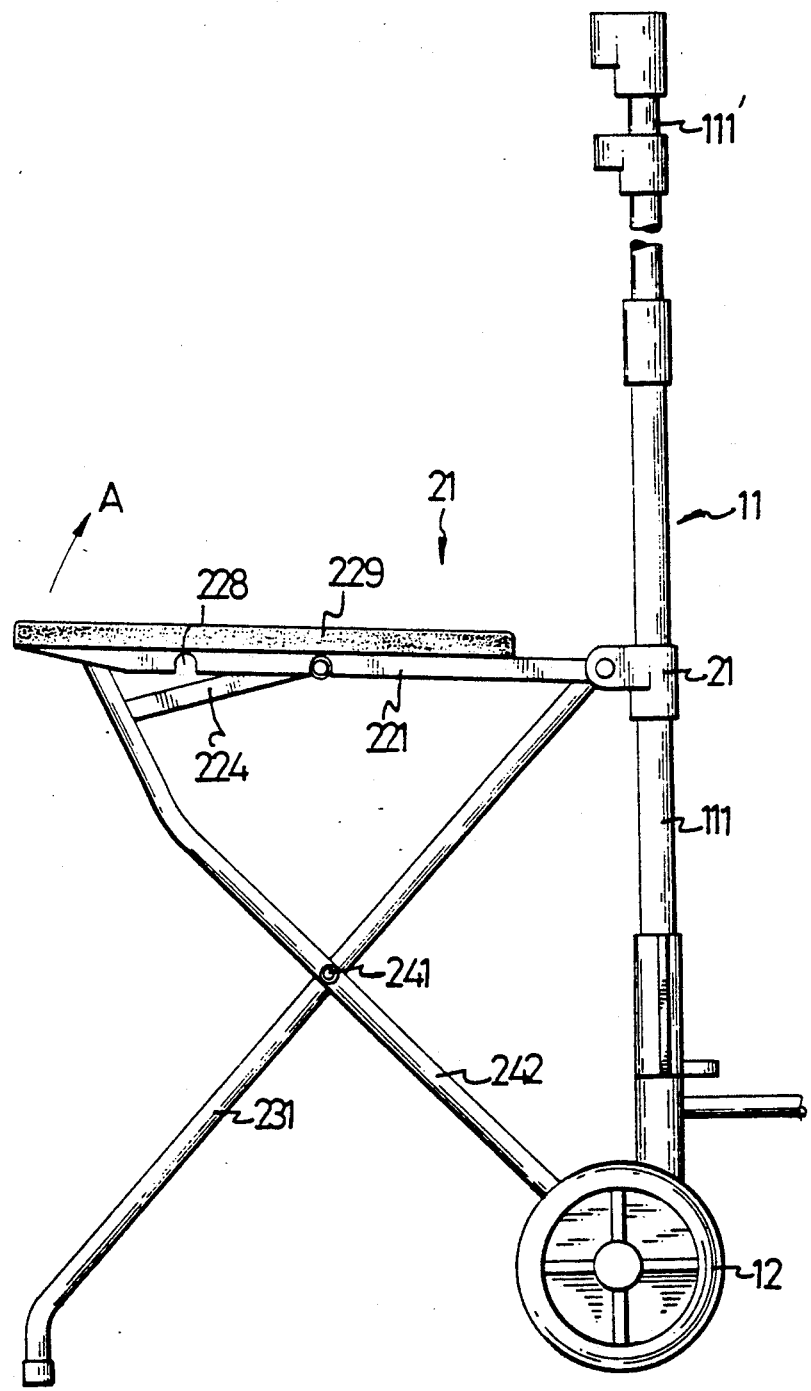
FIG. 3 is a schematic side view of the trolley in which the foldable seat assembly is in an extended status.

In use, as illustrated in FIG. 3, the foldable seat assembly 20 is in an extended status for a user to sit thereon. The lower ends of the first pair of stands 23 stand on the ground, together with the wheels 12 to provide stable support. The upper ends of the second pair of stands 24 contact an underside of the seat plate 229 and thus support the seat plate 229.

Figure 4:
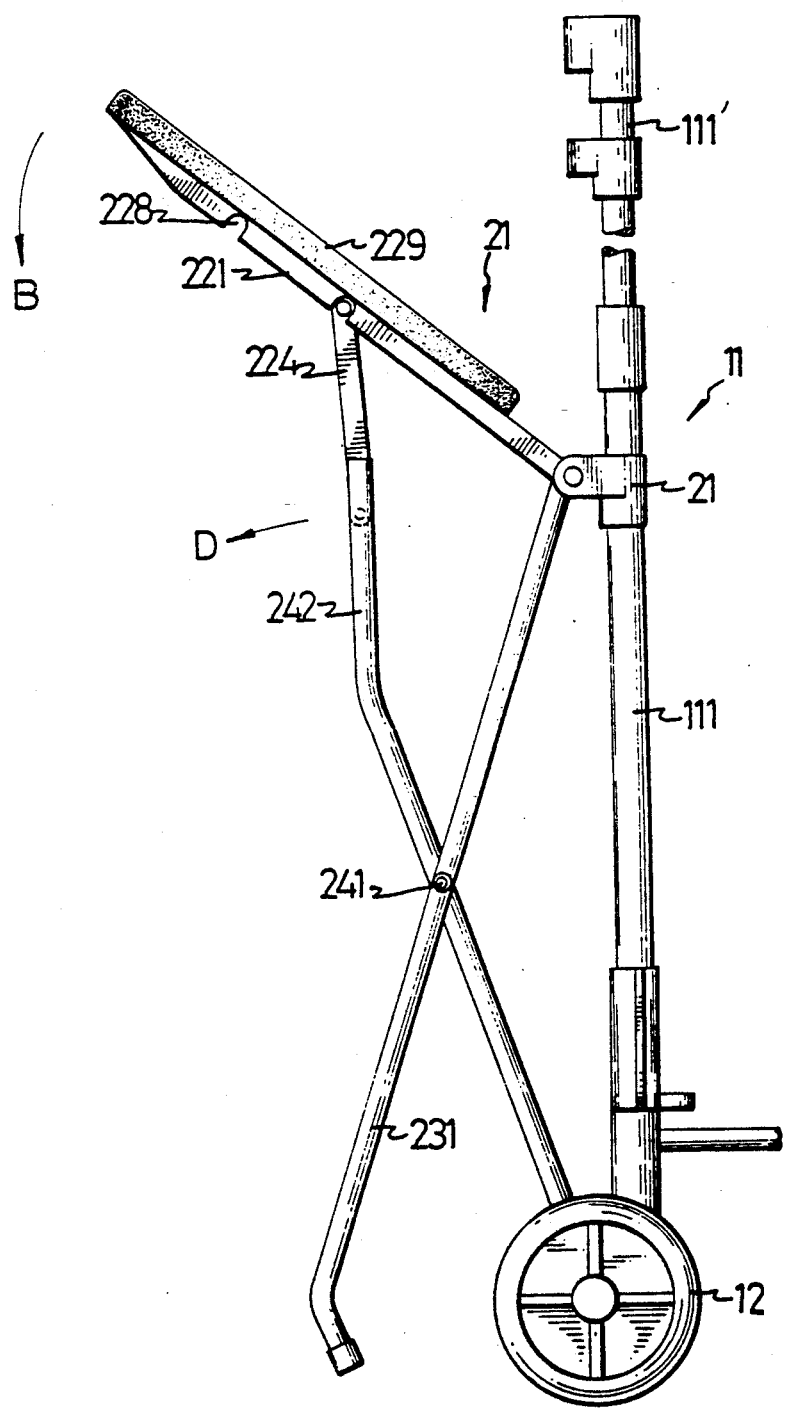
FIG. 4 is a schematic side view showing operation of folding the foldable seat assembly.

For folding the seat assembly 20, the user may lift the seat plate 229 together with the first and second seat-supporting members 221 and 222 along a direction indicated by arrow A until the second pair of stands 24 is substantially in alignment with the swaying members 224 and 225, as shown in FIG. 4 (note that the first and second swaying members 224 and 225 are pivoted to abut the linking rod 226). At the same time, the sleeve means 21 slides slightly downward. Then, the seat plate 229 and the seat supporting members 221 and 222 are pushed along a direction indicated by arrow B until the seat-supporting members 221 and 222 against the second pair of stands 24. Therefore, pushing the seat plate 229 folds the whole seat assembly 20 to a folded status shown in FIG. 5, in which the sleeve means 21 slides upward along the outer vertical bars 111 and 112. It is noted that the retaining rings 26 engage with the cutout 228 so that the folded seat assembly does not rattle or shake.

Figure 5:
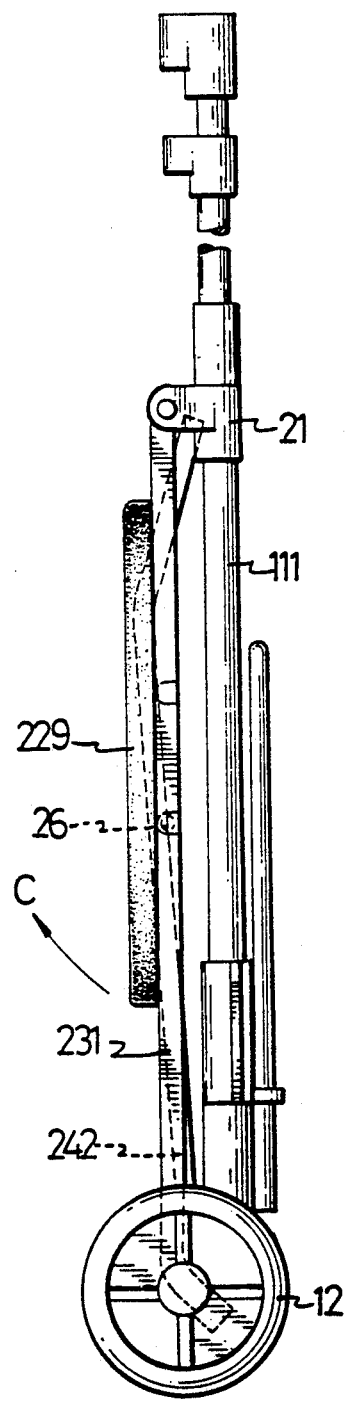
FIG. 5 a schematic side view of the trolley with the foldable seat assembly in a folded status.

For extending (unfolding) the folded seat assembly 20 shown in FIG. 5 to the extended status shown in FIG. 3, the user may pull the lower end of the seat plate 229 along a direction indicated by arrow C until the second pair of stands 24 substantially in alignment with the swaying members 224 and 225 is shown in FIG. 4. Then, the pivoting point is pulled outward along a direction indicated by arrow D to the extended status shown in FIG. 3. In this position the upper ends of the third stand 242 and fourth stand 243 contact an underside of the seat plate 229 to provide a stable seat on which the user may sit.

As various possible embodiments might be made of the above invention without departing from the scope of the invention, it is to be understood that all matter herein described or shown in accompanying drawing is to be interpreted as illustrative and not in a limiting sense. Thus it will be appreciated that the drawing are exemplary of a preferred embodiment of the invention.

I claim:

1. A trolley comprising:
   (A) a main frame having a pair of outer vertical bars and a pair of inner vertical bars telescopically received in said outer vertical bars;
   (B) a wheel means attached to said main frame;
   (C) a support frame securely attached to said main frame for carrying articles disposed thereon; and
   (D) a foldable seat assembly attached to said main frame such that said main frame is positioned between said foldable seat assembly and said support frame, said foldable seat assembly comprising:
   (1) a sleeve means slidably mounted on said pair of outer vertical bars; and
   (2) a seat means pivoted to said sleeve means, said seat means comprising:
      (a) two seat-supporting members pivoted to said sleeve means;
      (b) a connecting member attached by respective ends thereof to middle portions of said two seat-supporting members;
      (c) two swaying members having first ends thereof respectively pivoted to said ends of said connecting member; and
      (d) a linking rod to which second ends of said two swaying members is pivotally attached;
   (3) a seat plate fixed on a top side of said first ends of said second seat-supporting members;
   (4) a first pair of stands pivoted to said sleeve means; and
   (5) a second pair of stands pivoted to a middle portion of said first pair of stands at a middle portion thereof and pivoted to a cross bar of said main frame at a lower end thereof, said linking rod being pivotally attached between said second pair of stands; such that when said seat assembly is in an extended status, said lower ends of said first pair of stands rest on the ground, together with said wheel means, to provide stable support, upper ends of said second pair of stands contact an underside of said seat plate and thus support said seat plate, and when said seat assembly is in a folded status, said seat plate closes to said main frame and said first and second pairs of stands are folded therebetween.

2. A trolley as claimed in claim 1, wherein said swaying members are pivoted to said connecting member by screws, and each said seat-supporting member further has a first cutout portion through which said screws are mounted.

3. A trolley as claimed in claim 1, further comprising a retaining element provided between middle pivot points of said first and second pair of stands, and a second cutout portion being formed on each said first and second seat-supporting members for engaging with said retaining members, insuring that said seat assembly maintains said folded status.

* * * * *